Figure 1:
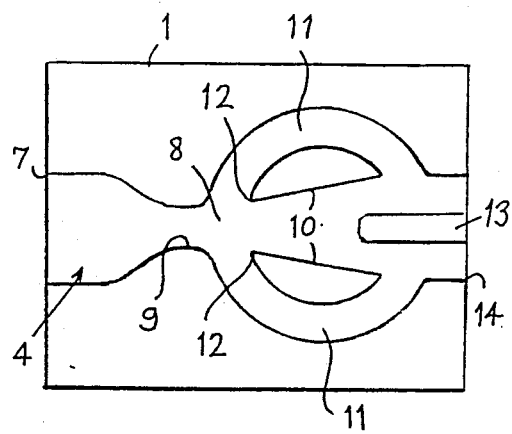

United States Patent [19]

Churchill et al.

[11] Patent Number: 4,911,007
[45] Date of Patent: Mar. 27, 1990

[54] FLOWMETER

[75] Inventors: David A. Churchill, Solihull; Geoffrey J. Parkinson, Sutton Coldfield, both of England

[73] Assignee: British Gas Plc, London, England

[21] Appl. No.: 207,241

[22] Filed: Jun. 16, 1988

[30] Foreign Application Priority Data

Jun. 19, 1987 [GB] United Kingdom ............... 8714395

[51] Int. Cl.$^4$ ............................................. G01F 1/00
[52] U.S. Cl. ..................................... 73/202; 73/861.19
[58] Field of Search .......................... 73/202, 861.19

[56] References Cited

U.S. PATENT DOCUMENTS

| | | | |
|---|---|---|---|
| 3,690,171 | 9/1972 | Tippetts et al. | 73/861.19 |
| 3,902,367 | 9/1975 | Grant et al. | 73/861.19 |
| 4,050,304 | 9/1977 | Thomas | 73/861.19 |
| 4,107,990 | 6/1974 | Ringwall . | |
| 4,280,360 | 7/1981 | Kobayashi et al. | 73/198 |
| 4,381,668 | 5/1963 | Sato et al. | 73/202.5 |
| 4,610,162 | 9/1986 | Okabayashi et al. | 73/861.19 X |

FOREIGN PATENT DOCUMENTS 1453587 10/1976 United Kingdom .
2177204 1/1987 United Kingdom .

OTHER PUBLICATIONS

Wright, "The Counda Meter-A Fluidic Digital Gas Flowmeter" in J. Physics E: Sci. Instrum., vol. 13, 1980, pp. 433-436.

*Primary Examiner*—Herbert Goldstein
*Attorney, Agent, or Firm*—Oblon, Spivak, McClelland, Maier & Neustadt

[57] ABSTRACT

A fluidic oscillator for a shunt flowmeter for measuring gas flow through a pipeline, comprises three sections arranged in series and providing a generally U-shaped flow path through the oscillator. The first section has an inlet end connectable to an outlet port in the pipeline and leading to a main fluid nozzle communicating with an interaction chamber, diverging sidewalls of the flow path extending downstream of the interaction chamber, and feedback loops extending from the diverging sidewalls to control nozzles at the interaction chamber. The second section is juxtaposed to the first section to return the flow to the pipeline and has an outlet end connectable to a return port in the pipeline. The second section includes diverging sidewalls terminating in a flow restriction adjacent the outlet end, and a flow-splitter body physically dividing the flow. Sensor ports are provided on opposite sides of the flow-splitting body for the connection of a flow sensor to detect oscillations in the gas flow through the second section. A third section interconnects the outlet end of the first section with the inlet end of the second section and includes a flow-splitting partition aligned with the flow-splitting body. A flow-splitting member is provided at and adjacent the outlet end of the first section for dividing the flow from the interaction chamber prior to entry into the third section.

10 Claims, 3 Drawing Sheets

FLOWMETER

The present invention relates to flowmeters of the type incorporating fluidic oscillators and, more particularly, to a construction of fluidic oscillator for use in a shunt or bypass flowmeter, Mass flow sensors fabricated on silicon chips are being designed and developed by semiconductor manufacturers and it would be desirable to exploit the capabilities of such sensors to improve the flowmetering of fluids, such as, air and other gas supplies in industrial plants. However, the linear dimensions of the active flow sensing elements on silicon chips are typically 1 or 2 mm whereas the dimensions of industrial air and other gas supply pipelines are typically 25 to 300 mm in diameter. Hence, the accurate measurement of air or gas flows in such pipelines using silicon chip flow sensors is not straightforward, particularly in the case of air, as this often originates from factory atmospheres which are contaminated with process dust and dirt. Any flowmeter incorporating a silicon chip flow sensor must be capable of operating on or near industrial fired plant, for example, in rolling mills, foundries, or boilerhouses, where temperatures as high as 100° C. are occasionally encountered, with air supplies which are often contaminated with dust/dirt particles or fumes from industrial processes, and where flow oscillations arising from combustion air fans are present in varying degrees in the air supply lines.

Flowmetering units based on fluidic oscillators, that is, a device which produces oscillations when it is energized by a fluid flow, are known. One such device is described in GB-A-1453587. It is envisaged that a flowmeter suitable for use with a silicon chip sensor could be based on fluidic oscillator principles. The accuracy and range of flow measurement would then primarily depend upon the geometry of the fluidic oscillator, with the silicon chip flow sensor being used in a digital mode for detecting and counting the fluid flow oscillations or reversals. In these circumstances, it would be desirable to design the fluidic oscillator so that it could be used with the standard range of pipeline diameters and one solution to this pipeline sizing problem is the development of a fluidic unit that can be used in a shunt or bypass flowmeter with any size of pipeline diameter. The shunt arrangement is particularly attractive for air supply pipes, which correspond to the larger pipe diameters, as this would also provide a way of protecting the flow sensor from high velocity dust impingement.

It is an object of the present invention to provide a fluidic oscillator for use in a shunt flow-meter for measuring the mass flow of air or other gas through a pipeline. Another object is to provide such a fluidic oscillator which enables flow rates to be accurately measured with the aid of a silicon chip flow sensor. A further object is to provide a fluidic oscillator which embodies one or more of the desirable design features referred to above.

The present invention consists in a fluidic oscillator for a shunt flowmeter for measuring fluid flow through a pipeline, comprising a first section having an inlet end for connection to an outlet port in the pipeline, an interaction chamber, a main fluid nozzle connected to the inlet end of the section and directed into the interaction chamber, diverging sidewalls extending downstream from the interaction chamber, and feedback loops extending from the diverging sidewalls to control nozzles at the interaction chamber, and a second section downstream of and juxtaposed the first section for returning the flow from the first section to the pipeline, said second section having an outlet end for connection to a return port in the pipeline and being adapted to mount a flow sensor for detecting oscillations in the fluid flow through the second section.

Preferably, the first and second sections are disposed side-by-side so that the general directions of the fluid flow therethrough are substantially parallel and opposite, the first section having an outlet end connected to an inlet end of the second section by a third section, for example, disposed substantially at right angles to the outlet and inlet ends of the first and second sections. Conveniently, the oscillator is constructed of three parts, each of which contains one of the sections.

The second section may include a flow-splitting body for physically dividing the flow from the first section. Sensor ports, via which the flow sensor is connected to the second section may be disposed respectively on opposite sides of this flow-splitting body. The second section may also have diverging sidewalls which terminate in a flow restriction adjacent the outlet end of the second section.

The third section may have substantially parallel sidewalls with a flow-splitting partition disposed parallel to the sidewalls and aligned with the flow-splitting body of the second section. A flow-splitting member may also be disposed at and adjacent the outlet end of the first section, in alignment with the flow-splitters of the two successive sections.

A flow conditioner may be disposed across at least the inlet end of the first section, the conditioner serving both to promote turbulence of fluid flowing into the inlet and as a filter for removing particulate matter from the fluid. In a preferred embodiment this conditioner is mounted in a fourth part for the oscillator which is assembled to the inlet and outlet ends of the first and second sections so that, when the flowmeter is connected to the pipeline, the conditioner is disposed between the outlet bypass port of the pipeline and the inlet to the oscillator.

Figure 2:
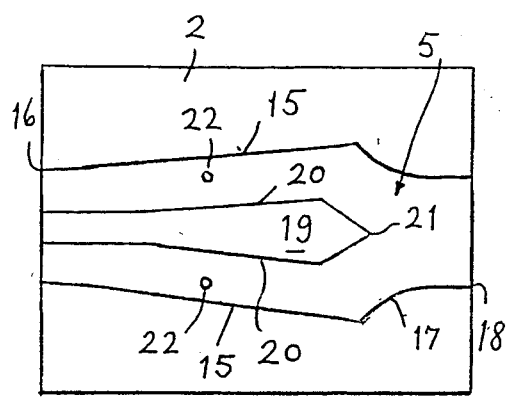
Figure 3:
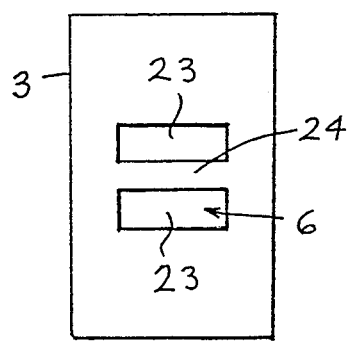
Figure 4:
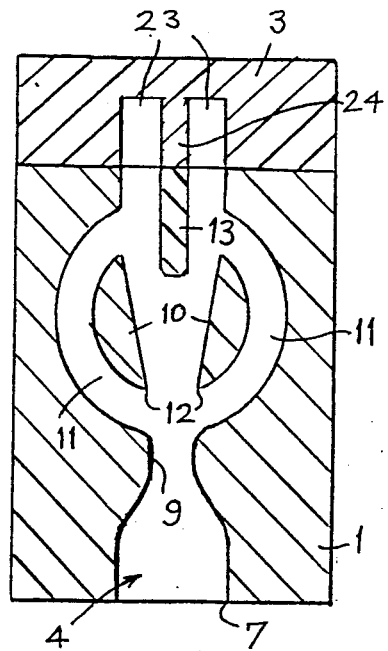
Figure 5:
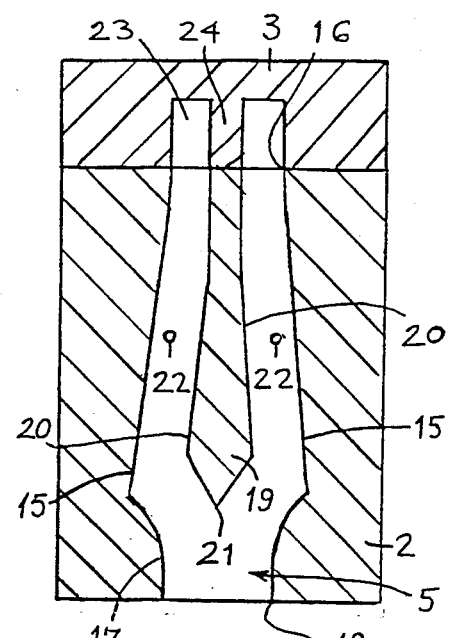
Figure 6:
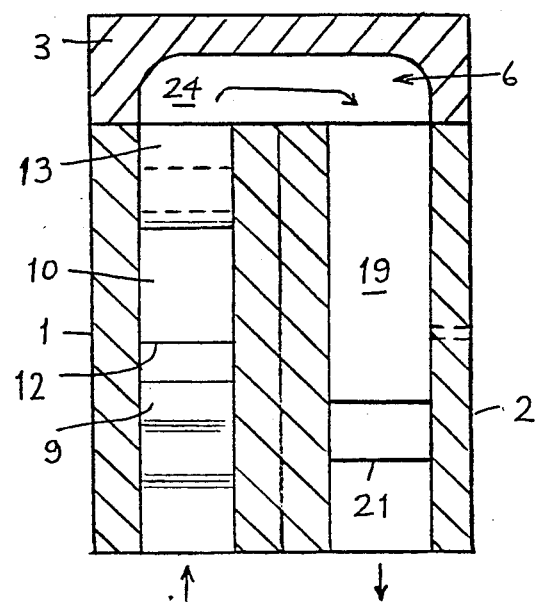
Figure 7:
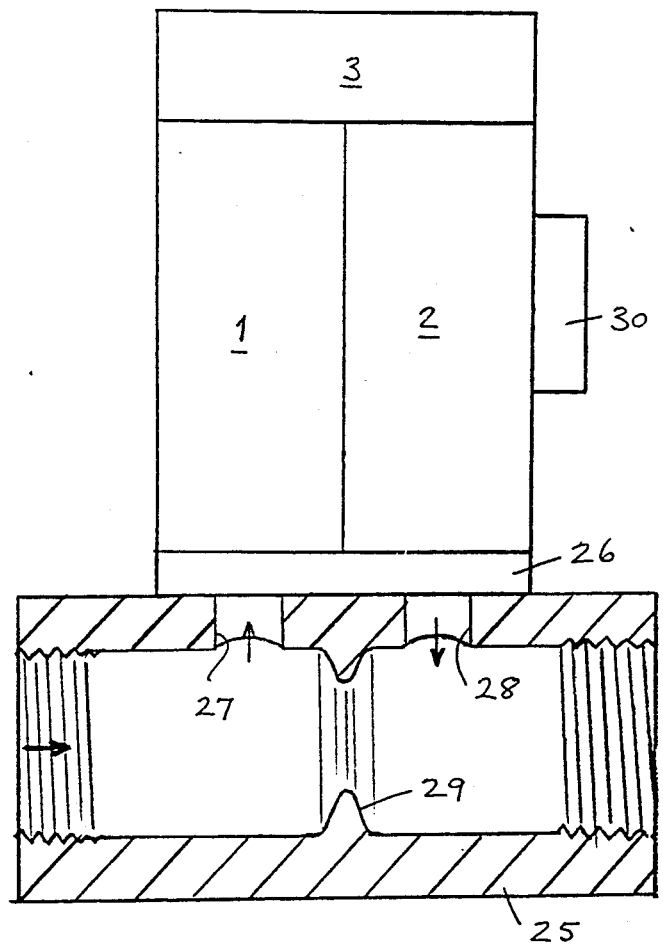

In order that the present invention may be more readily understood, reference will now be made to the accompanying drawings, in which:

FIGS. 1, 2 and 3 are respectively plan views of the parts of a fluidic oscillator constructed in accordance with the invention, FIGS. 4 and 5 are sectional views of the assembled oscillator taken on mutually parallel planes through the first and second sections, respectively, FIG. 6 is a sectional view on a plane at right angles to the sections of FIGS. 4 and 5, and FIG. 7 is an axial section through a pipeline fitted with a flowmeter embodying the invention.

The fluidic oscillator illustrated in the drawings is assembled from three block-shaped parts 1, 2 and 3, each of which contains one of the principle sections 4, 5 and 6 of the oscillator. FIGS. 1, 2 and 3 are plan views of these disassembled parts, the facing sides of the two parts illustrated in FIGS. 1 and 2 having been removed to show the first and second flow sections 4,5 defined by these parts.

The first section 4 comprises an inlet end 7 for connection to an outlet port of a pipeline to which the flowmeter is to be fitted, an interaction chamber 8, a main fluid nozzle 9 connected to the inlet end 7 and directed into the interaction chamber, diverging sidewalls 10 extending from the interaction chamber, and feedback loops 11 extending from the diverging sidewalls, downstream of the interaction chamber, to control nozzles 12 at the interaction chamber. A flow-splitting member 13 for physically dividing the flow through the section is disposed at and adjacent the outlet end 14 of the section.

The second section 5 has diverging sidewalls 15 extending from the inlet end 16 of the section and terminating in a flow restriction 17 adjacent its outlet end 18. A flow-splitting body 19 for physically dividing the flow through the section projects from its inlet end 16 to a position adjacent the restriction 17. Along the major portion of its length the sidewalls 20 of the flow-splitting body 19 diverge generally parallel to the sidewalls 15 of the section. At the outlet end of the body 19, generally opposite the flow restriction 17, the sidewalls 20 converge to an edge 21. Sensor ports 22, via which a flow sensor, is connected to the second section, are positioned on opposite sides of the flow-splitting body 19.

The third section 6 comprises two mutually parallel channels 23 for joining the outlet and inlet ends 14, 16 of the first and second sections and separated from one another by a flow-splitting partition 24 arranged to be aligned with the flow-splitting member 13 and body 19 of the other two sections. The overall width of the third section corresponds to the width of the outlet and inlet ends of the first and second sections and the walls of the channels are mutually parallel.

The various flow passages of the three sections 4, 5, 6 are of generally rectangular cross-section.

Referring to FIGS. 4, 5 and 6, which illustrate sectional views through the assembled oscillator, in the assembled condition, the two block-shaped parts 1,2 are mounted side-by-side so that the directions of flow through the two sections 4,5 are substantially parallel and in opposite directions and the third part 3 is fastened across the ends of the parts 1,2, so that the channels 23 are at right angles to the outlet and inlet ends 14,16 of the first and second sections and interconnect the latter with the flow-splitting partition 24 aligned with the flow-splitting member and body 13,19 of the first and second sections. Hence, the three sections are arranged in series and provide a generally U-shaped flow path for the oscillator.

FIG. 7 illustrates a flowmeter incorporating the fluidic oscillator described above mounted on a section 25 of gas supply pipe and also illustrates a flow conditioner in the form of a wire mesh 26 by which the inlet and outlet ends of the flowmeter may be connected to the pipeline. Hence, the section 25 of pipe is adapted to be connected into a pipeline to be fitted with the flowmeter. It is provided with shunt inlet and outlet ports 27,28 for bypassing a portion of the gas flow in the pipeline through the flowmeter, these ports being positioned on opposite sides of a restriction 29 formed in the pipe section 25. The flowmeter comprises the assembled parts 1,2,3 of the fluidic oscillator, a flow sensor 30 based on a silicon chip and mounted on the outside of the part 2 for detecting the oscillations in the fluidic oscillator, via the sensor ports 22 (FIGS. 2 and 5), the flow conditioner 26 disposed over the inlet and outlet ends of the first and second sections of the oscillator and mounting suitable flow conditioner means (not shown) between these inlet and outlet ends and the shunt inlet and outlet ports 27,28 of the pipe section 25.

Whilst particular embodiments have been described, it will be understood that modifications can be made without departing from the scope of the invention.

We claim:

1. A fluidic oscillator for a shunt flowmeter for measuring fluid flow through a pipeline, comprising:
    a first section having an inlet end for connection to an outlet port in the pipeline;
    an interaction chamber;
    a main fluid nozzle connected to the inlet end of the section and directed into the interaction chamber;
    diverging sidewalls extending downstream from the interaction chamber, and feedback loops extending from the diverging sidewalls to control nozzles at the interaction chamber, and a second section downstream of and juxtaposed the first section and having passage means for returning the flow from the first section to the pipeline, said second section having an outlet end for connection to a return port in the pipeline and means for communicating said passage means with a flow sensor for detecting oscillations in the fluid flow through the second section, the first and second sections being disposed side-by-side so that the general directions of the fluid flows therethrough are substantially parallel and opposite, the first section having an outlet end connected to an inlet end of the second section by a third section; wherein said oscillator is formed from a number of parts which are assembled together to construct the oscillator having said sections; and
    a flow conditioner being disposed across at least the inlet end of the first section, the conditioner serving both to promote turbulence of fluid flowing into the inlet and as a filter for removing particulate matter from the fluid, and the said flow conditioner being mounted in another part which is assembled to the inlet and outlet ends of the first and second sections.

2. A fluidic oscillator as claimed in claim 1, in which the second section includes a flow-splitting body for physically dividing the flow from the first section.

3. A fluidic oscillator as claimed in claim 2, in which the communicating means are sensor ports via which the flow sensor is connected to the second section, and said sensor ports are disposed respectively on opposite sides of the flow-splitting body.

4. A fluidic oscillator as claimed in claim 3, in which the second section has diverging sidewalls which terminate in flow restriction adjacent the outlet end of the second section.

5. A fluidic oscillator as claimed in claim 4, in which the third section is disposed substantially at right angles to the outlet and inlet ends of the first and second sections and has substantially parallel sidewalls.

6. A fluidic oscillator as claimed in claim 5, in which the third section has a flow-splitting partition disposed parallel to the sidewalls and aligned with the flow-splitting body of the second section.

7. A fluidic oscillator as claimed in claim 6, in which a flow splitting member is disposed at and adjacent the outlet end of the first section in alignment with the flow splitting partition of the third section.

8. A fluidic oscillator as claimed in claim 1 comprising three said parts assembled together to construct the oscillator having said sections, and said flow conditioner is mounted in a fourth part which is assembled to the inlet and outlet ends of the first and second sections.

9. A fluid oscillator as claimed in claim 1, in which the three sections are formed respectively in three said parts which are assembled together to construct the oscillator, and the flow conditioner is mounted in a fourth said part which is assembled to the inlet and outlet ends of the first and second sections.

10. A flowmeter for measuring fluid flow through a pipeline, comprising a fluidic oscillator as claimed in claim 1, and a flow sensor arranged to detect oscillations within the fluidic oscillator and including a silicon chip sensor.

* * * * *